United States Patent [19]

Vora

[11] Patent Number: 4,973,651

[45] Date of Patent: Nov. 27, 1990

[54] POLYIMIDE POLYMERS HAVING 12-F FLUORINE-CONTAINING LINKING GROUPS

[75] Inventor: Rohitkumar H. Vora, Union County, N.J.

[73] Assignee: Hoechst Celanese Corp., Somerville, N.J.

[21] Appl. No.: 348,632

[22] Filed: May 8, 1989

[51] Int. Cl.$^5$ .............................................. C08G 12/00
[52] U.S. Cl. ..................................... 528/183; 528/176; 528/188; 528/229; 528/353
[58] Field of Search ............... 528/183, 353, 176, 188, 528/229

[56] References Cited

FOREIGN PATENT DOCUMENTS 1062435   3/1967   United Kingdom ................ 528/353

*Primary Examiner*—Morton Foelak
*Attorney, Agent, or Firm*—Perman & Green

[57] ABSTRACT

The present invention provides novel heat stable polyimide and polyamic acid precursor polymers having excellent flow properties which render them more readily processible into fibers, films, sheets and other molded articles. The polymers are prepared by forming the polycondensation product of one or more aromatic diamines and one or more aromatic dianhydride monomers, at least one of said diamine monomers having the structure:

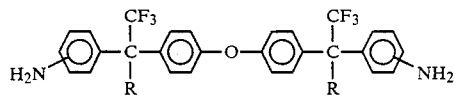

wherein R is CF$_3$ or phenyl. The polyimides of this invention exhibit improved solubility and low temperature flow characteristics, low moisture uptake, high thermal stability, low dielectric constant and good hydrolytic stability.

13 Claims, No Drawings

POLYIMIDE POLYMERS HAVING 12-F FLUORINE-CONTAINING LINKING GROUPS

BACKGROUND OF THE INVENTION

1. Field of the Invention

The present invention relates to aromatic polyimide polymers based on an amino-monomer containing two hexafluoro-isopropylidine linking groups or two 1-phenyl-2,2,2-trifluorethane linking groups, and having improved physical, mechanical and chemical properties, and to a method for preparing such polymers.

2. Description of Related Art

Polyimide condensation products of 2,2-bis(4-aminophenyl) hexafluoropropane (hereinafter referred to as 4,4'-6F-Diamine) and aromatic dianhydrides are known in the art and are described in U.S. Pat. No. 3,356,648. These polyimides are produced by first preparing a polyamic acid condensation product of the diamine and dianhydride, such as pyromellitic dianhydride and 4,4'-6 F diamine, in suitable solvent, followed by conversion of the polyamic acid to the polyimide. Imidization is preferably carried out by the application of a solution of the polyamic acid to a substrate, by the evaporation of the solvent and by heating the resultant film to temperatures in the order of 270° to 300° C. for about 2 hours. These polyimides possess excellent heat stability, good electrical properties and high tensile strength.

U.S. Pat. No. 4,592,929 discloses similar polyimides prepared by imidization of the polyamic condensation product of 2,2-bis(3-aminophenyl) hexafluoropropane with 4,4'-hexafluoro isopropylidenebis(phthalic anhydride). These polyimides are disclosed to be particularly suitable as protective coatings for solar cells.

U.S. Pat. No. 4,111,906 to Jones et al. discloses polyimides prepared from 2,2-bis[4-(4aminophenoxy)phenyl] hexafluoropropane, and U.S. Pat. No. 4,477,648 to Jones et al. discloses polyimides prepared from 2,2-bis[(2-halo-4-amino-phenoxy)phenyl] hexafluoropropane.

Copending application U.S. Ser. No. 316,254 filed in the USPTO on Feb. 27, 1989 discloses polyamide-imide polymers based on the polymer condensation product of a mixture of trimellitoyl anhydride chloride and at least one diamine selected from the group consisting of 4,4'-bis [4-(aminophenoxyphenyl) hexafluoroisopropyl] diphenyl ether, 4,4'-bis [2-(4-aminophenyl) hexafluoroisopropyl] diphenyl ether and 4,4'-bis [2-(3-aminophenyl) hexafluoroisopropyl] diphenyl ether.

These amino monomers contain two hexafluoroisopropylidene linking groups and are referred to as 12F-Diamines. The polyamide-imide prepared according to the above mentioned application have outstanding flow properties, good thermal properties and good solubility in aprotic organic solvents.

Polyimides prepared from so called 12-F monomers are disclosed in Applicants copending applications Ser. No. 124,720 and Ser. No. 124,704 filed in the USPTO on Nov. 24, 1987. These polymers may be prepared by forming the polymer condensation product of an aromatic diamine and 4,4'-bis[2-(3,4-dicarboxyphenyl) hexafluoroisopropyl] diphenyl ether dianhydride—Ser. No. 124,720—or condensation of an aromatic dianhydride with 4,4'-bis[2-(amino phenoxyphenyl) hexafluoroisopropyl] diphenyl ether—Ser. No. 124,704—. These polyimides are also characterized as having improved solubility in organic solvents, low dielectric constants, superior thermal and thermoxidative stability and improved processing characteristics.

SUMMARY OF THE INVENTION

The present invention provides novel heat stable polyimide and polyamic acid precursor polymers having excellent flow properties which render them more readily processible into fibers, films, sheets and other molded articles. The polymers are prepared by forming the polycondensation product of one or more aromatic diamines and one or more aromatic dianhydride monomers, at least one of said diamine monomers having the structure:

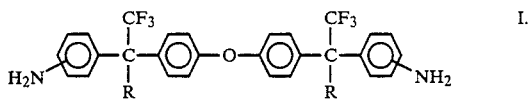

wherein R is $CF_3$ or phenyl. The polyimides of this invention exhibit improved solubility and low temperature flow characteristics, low moisture uptake, high thermal stability, low dielectric constant and good hydrolytic stability.

DETAILED DESCRIPTION OF THE INVENTION

The polyimides of this invention may be characterized as containing structural units of the formula:

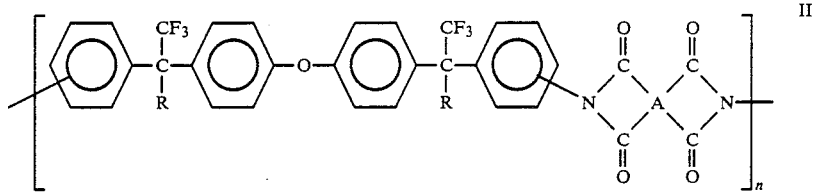

wherein R is $CF_3$ or phenyl, n is a number sufficient to give rise to a polymer having an inherent viscosity of at least about 0.05 as measured from a solution of the polymer in dimethyl acetamide at 25° C. at a polymer concentration of 0.5 weight percent and A is a tetravalent aromatic organic radical wherein each pair of carbonyl groups are attached to adjacent carbon atoms in the ring of moiety A.

Preferably A in formula II comprises a phenylene, naphthalene or a bis-phenylene type compound, or a mixture of such compounds, all of which may be unsubstituted or substituted with halogen, hydroxy, $C_1$ to $C_6$ alkyl or $C_1$–$C_6$ alkoxy groups, n is a number sufficient to provide an inherent viscosity of at least about 0.1 dl/g as measured from a solution of the polymer in dimethylacetamide at 25° C. at a polymer concentration of 0.5 weight percent, and R is CF$_3$.

The polyimide polymers of this invention are those prepared using 12F-Diamine monomers such as 4,4'bis[2-(4-aminophenyl) hexafluoroisopropyl]diphenylether, and 4,4,'-bis[2-(3-aminophenyl) hexafluoroisopropyl]diphenyl ether.

Illustrative of tetracarboxylic acid dianhydrides which are suitable for use in the present invention are:

1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride; dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3'4,4'-benzophenone tetracarboxylic acid dianhydride;
2,2',3,3'-benzophenone tetracarboxylic acid dianhydride;
2,3,3',4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl]propane dianhydride;
2,2-bis[4-(3,4-dicarboxyphenoxy) phenyl]propane dianhydride;
4-(2,3-dicarboxyphenoxy)-4'-(3,4-dicarboxyphenoxy) diphenyl-2,2-propane dianhydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxyphenyl) hexafluoropropane dianhydride;
3-bis(3,4-dicarboxyphenyl) hexafluoropropane dianhydride; 1-bis(3,4-dicarboxyphenyl)-1-phenyl-2,2,2-trifluoroethane dianhydride;
2,2-bis[4-(3,4-dicarboxyphenoxy) phenyl] hexafluoropropane dianhydride;
1,1-bis[4-(3,4-dicarboxyphenoxy) phenyl]-1-phenyl-2,2,2-trifluoroethane dianhydride; and
4,4'-bis[2-(3,4-dicarboxyphenyl)hexafluoroisopropyl]-diphenyl ether dianhydride;
bis[2-(4-carboxyphenyl) hexafluoroisopropyl] diphenyl ether dianhydride; and mixtures thereof.

One skilled in the art will recognize that the tetracarboxylic acids and acid-esters of the above-listed dianhydride compounds may also be used to produce the polyimides. These tetracarboxylic acids or derivatives thereof are available or may be prepared by known methods. For example, U.S. Pat. Nos. 3,847,867 to Heath et al. and 4,650,850 to Howson, which are incorporated herein by reference, show the preparation of bis(ether anhydrides) and bis(dialkyl aromatic ether anhydrides), respectively. The preparation of fluorine-containing dianhydrides is disclosed in U.S. Pat. Nos. 3,310,573 to Gordon and 3,649,601 to Critchley et al., which are also incorporated herein by reference. The preferred polyimides of this invention are prepared by reacting the 12F-Diamine with 1,2,4,5-benzene tetracarboxylic acid dianhydride (also known as pyromelittic dianhydride-PMDA), bis(3,4-dicarboxyphenyl) ether dianhydride (also known as oxyphthalic dianhydride-ODPA), 3,3',4,4'-benzophenone tetracarboxylic acid dianhydride (also known as benzo-phenonetetracarboxylic dianhydride-BTDA), 3,4',4,4'-diphenyl tetracarboxylic acid dianhydride (BPDA), 2,2-bis(3,4-dicarboxyphenyl) hexafluoropropane dianhydride (6FDA), and 4,4'-bis[2-(3,4 dicarboxyphenyl) hexafluoroisopropyl]diphenyl ether dianhydride (12F-Dianhydride). Mixtures of two or more of these dianhydrides may be employed to produce copolyimides. Copolyimides of the present invention may also be prepared using a mixture of 12F-Diamine and one or more other diamines having the formula:

NH$_2$—Y—NH$_2$     (3)

wherein Y is an aromatic moiety of a phenylene naphthalene or bis-phenylene type compound which may be unsubstituted or ring substituted with halogen, hydroxy, lower C$_1$ to C$_6$ alkyl or lower C$_1$ to C$_6$ alkoxy groups. Where such diamine mixtures are employed, the molar ratio of 12F-Diamine and said one or more other diamines is preferably within the range of about 2 to 1 to about 1 to 2 based on the total moles of diamine present.

Illustrative of diamines which are suitable for use in mixtures with 12F-Diamine are:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;

bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
3,4'-oxydianilin;
2,2-bis(3-amino-4-methylphenyl)hexafluoropropane
2,2-bis(4-amino-3-methylphenyl)hexafluoropropane
2,2-bis(3-amino-4,5-dimethylphenyl)hexafluoropropane
2,2-bis(4-amino-3,5-dimethylphenyl)hexafluoropropane
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2-(3-aminophenyl)-2-(4-aminophenyl)hexafluoropropane;
2,2-bis(3-aminophenyl) hexafluoropropane;
2,2-bis[4-(4-aminophenoxy)phenyl] hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl)decafluoropentane;
4,4'-bis[4-(aminophenoxyphenyl)hexafluoroisopropyl] diphenyl ether;
4,4'-bis[3-(aminophenoxyphenyl)hexafluoroisopropyl] diphenyl ether; 2-(3-aminophenyl)-2-(4-aminophenyl)hexafluoropropane; and mixtures thereof.

A preferred process for preparing the polyimides of this invention involves first preparing a polyamide-acid by reacting the diamine and the tetracarboxylic acid or derivative such as the dianhydride in an organic solvent, preferably under substantially anhydrous conditions for a time and at a temperature sufficient to provide at least 50% of the corresponding polyamide-acid, and then converting the polyamide-acid to the polyimide. Suitable conditions for reacting the diamine and the dianhydride are disclosed in detail in U.S. Pat. Nos. 3,356,648 and 3,959,350, both to Rogers, which are incorporated herein by reference. The intermediate polyamide-acid may also be esterified to provide polyamide-esters.

The dianhydride and diamine reactants, particularly the monomers containing fluorine, are preferably substantially electronically pure and are referred to as electronic grade monomers. They generally should be at least about 99.5% pure.

The polyimides of the present invention are preferably prepared by a solution polymerization process, i.e., by reacting the acid anhydride and diamine monomers in an appropriate solvent, optionally in the presence of a catalyst or an added inorganic salt such as lithium chloride or calcium chloride, and in a nitrogen atmosphere. Polymerization is conducted under anhydrous, isothermal polymerization conditions and preferably at a temperature of less than 35° C. The intermediate polyamic acid reaction product may then be cyclized to form the polyimide either by chemical dehydration or by an appropriate heat treatment. The polymer may be recovered by precipitation in water or an alcohol such as methanol, and washed.

The solvents useful in the solution polymerization process for synthesizing the polyimide compositions are the organic solvents whose functional groups do not react with the reactants to any appreciable extent. In addition to being inert to the system, and preferably, being a solvent for the polyimide, the organic solvent must be a solvent for at least one of the reactants, preferably for all of the reactants. The normally liquid organic solvents of the N,N,dialkylcarboxylamide class are useful as solvents in the process. The preferred solvents are the lower molecular weight members of this class, particularly N,N-dimethylformamide, N,N-diethylacetamide, N,N-dimethylmethoxy-acetamide, N-methyl caprolactam, and the like. Other solvents which may be used include dimethylsulfoxide. n-methyl-2-pyrrolidone, tetramethyl urea, pyridine, dimethylsulfone, tetramethyl urea, pyridine, dimethylsulfone, hexamethylphosophoramide, tetramethylene sulfone, formamide, N-methylformamide, butyro-lactone and phenols such as m-cresol. The solvents can be used alone or in combination.

To obtain the maximum inherent viscosity, i.e., maximum degree of polymerization, for any particular combination of monomers, solvent, etc., and thus produce shaped articles such as films and filaments of optimum toughness, it has been found that the temperature throughout the reaction should be maintained below 50° C., preferably below about 35° C.

The degree of polymerization of the polyimides is subject to deliberate control. The use of equimolar amounts of the reactants under the prescribed conditions provides polyimides of very high molecular weight. The use of either reactant in large excess limits the extent of polymerization. In addition to using an excess of one reactant to limit the molecular weight of the polyimides, a chain terminating agent such as phthalic anhydride or a mono amine may be used to "cap" the ends of the polymer chains. Typical useful capping agents are monoanhydrides or monoamines such as phthalic anhydride, aniline or p-methylaniline. Preferred weight average molecular weights of the polyimides range from at least about 5,000 up to about 100,000 or more. In the preparation of the polyimides, it is desired that the molecular weight be such that the inherent viscosity of the polymer is at least about 0.05, more preferably from about 0.1 to about 2.0. The inherent viscosity is measured at 25° C. at a concentration of 0.5% by weight of the polymer in a suitable solvent such as dimethylacetamide.

The quantity of organic solvent used in the process need only be sufficient to dissolve enough of one reactant, preferably the diamine, to initiate the reaction of the diamine and the other monomers. It has been found that the most successful results are obtained when the solvent represents at least 60% of the final solution, that is, the solution should contain 0.05-40% of the polymeric component, more preferably 15 to 25%.

The second step of the process (dehydration) may be performed by treating the polyamic acid with a dehydrating agent alone or in combination with a tertiary amine such as acetic anhydride or an acetic anhydride-pyridine or beta picoline mixture. The ratio of acetic anhydride to amine can vary from just above zero to infinite mixtures.

Tertiary amines having approximately the same activity as the preferred pyridine or beta picoline can be used in the process. These include isoquinoline, 3,4-lutidine, 3,5-lutidine, 4-methyl pyridine, 3-methyl pyridine, 4-isopropyl pyridine, N,N-dimethyl benzyl amine, 4-benzyl pyridine, and N-N-dimethyl dodecyl amine. These amines are generally used from 0.3 to equimolar amounts with that of the anhydride converting agent. Trimethyl amine and triethlyne amines are much more reactive, and therefore are generally used in still small amounts. On the other hand, the following operable amines are less reactive than pyridine: 2-ethylpyridine, 2-methyl pyridine, triethyl amine, N-ethyl morpholine, N-methyl morpholine, diethyl cyclohexylaimine, N,N-dimethyl cyclohexylamine, 4-benzoyl pyridine, 2,4-lutidine, 2,6-lutidine and 2,4,6-collidine, and are generally used in larger amounts.

An alternative method for the preparation of the polyimides is the thermal dehydration of the intermediate polyamic acid. This transformation is generally performed in bulk, preferably in the form of a shaped article, e.g., film or filament of the polyamic acid. The dehydration is conducted stepwise starting at temperatures of about 100° C. and increasing the temperature progressively to about 300° C. or even higher, depending on the particular case, towards the end of the imidization step. The reaction is preferably performed under an inert atmosphere, and atmospheric or reduced pressures can be employed.

The polyimides of the present invention generally have a weight average molecular weight ($M_w$) within the range of from about 5,000 to about 50,000 or more.

The following examples are illustrative of the invention:

EXAMPLE 1

This Example details the preparation of a polyimide based on the polymer condensation product of 0.01 moles of 4,4,-bis[2-(4-aminophenyl) hexafluoroisopropyl diphenyl ether (12F-Diamine) and 0.01 moles of 2,2-bis(3,4dicarboxyphenyl) hexafluoropropane dianhydride (6F-Dianhydride) to yield a polyimide polymer having the following structure:

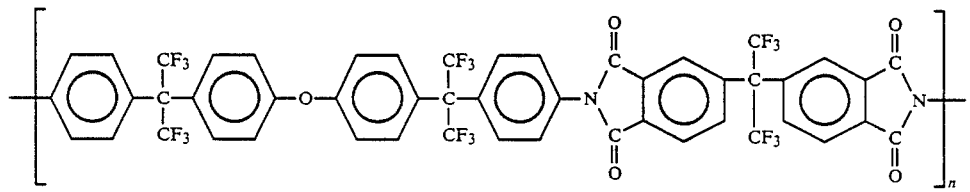

A 250 ml 3 neck flask fitted with a stirrer, condenser, Y tube, powder addition funnel, thermometer, dry ice acetone cooling bath and nitrogen blanket was charged under nitrogen atmosphere with 5.005 grams (0.01 mole) of 12F-Diamine along with 20 grams of reagent grade N-methyl pyrrolidone (NMP). The mixture was stirred to dissolve the diamine and cooled down to a temperature of about 15° C. A clear solution was obtained. 4.44 grams (0.01 mole) of 6F-Dianhydride was then gradually added to this solution over a period of about 2 minutes time while continuing agitation and maintaining a temperature of about 17° C. under nitrogen atmosphere. The beakers containing the reactants were rinsed with 33 grams of additional NMP and this was also added to the 15 polymerization solution. The mixture was then agitated for 21 hours at 20°-25° C. The resulting polyamic acid had an inherent viscosity of 0.38 dl/g measured as a 0.5 weight percent solution at 25° C. in dimethylacetamide. The polyamic acid was then imidized as follows: 1.03 grams of beta picoline were charged into the reaction flask under agitation followed by the dropwise addition of 10.3 grams of acetic anhydride. The mixture was allowed to agitate overnight for 22 hours at 22° C. The resulting polyimide was precipitated and washed with methanol and dried overnight in a vacuum oven at 80° C.

The polymer was further dried in an air circulating oven at 125° C. for 4 hours.

The resulting polyimide was soluble in NMP, DMAC tetrahydrofurane, acetone, methyl ethyl ketone, diglyme, butyrolactone and other aprotic solvents A cast film of the polyimide polymer was prepared by forming a 25% by weight solution in a 50/50 mixture of butyrolactone and diglyme and drawing down a glass plate. The cast film was then dried in an air circulating oven by heating it stepwise from about 20° C. to about 350° C. over a period of about 6 hours. The resulting film was self-supporting, flexible, clear and transparent.

EXAMPLE 2

Example 1 was repeated except that the 6F-Dianhydride was replaced with 0.01 mole of 4,4'-bis[2-(3,4-dicarboxyphenyl) hexafluoroisopropyl] diphenyl ether dianhydride [12F-Oxydianhydride].

The reaction and imidization was carried out as in Example 1 except that the following quantities of ingredients were employed:

| | |
|---|---|
| 12F-Diamine | 5.005 g (0.01 mole) |
| 12F-Oxydianhydride | 7.49 g (0.01 mole) |
| NMP | 70.80 g |
| Beta-Picoline | 1.42 g |
| Acetic Anhydride | 14.20 g |

EXAMPLE 3

This Example illustrates the preparation of a copolyimide based on the polymer condensation product of 12F-Diamine and an equimolar mixture of pyromellitic dianhydride (PMDA) and 3,3',4,4'-diphenyl tetracarboxylic acid dianhydride (BPDA).

The reaction and imidization was carried out as in Example 1 except the mixture of PMDA and BPDA was substituted for the 6F-Dianhydride. The following quantities of ingredients were employed:

| | |
|---|---|
| 12F Diamine | 10.01 g (0.02 mole) |
| PMDA | 2.20 g (0.01 mole) |
| BPDA | 2.96 g (0.01 mole) |
| NMP | 86.00 g |
| Beta Picoline | 1.76 g |
| Acetic Anhydride | 17.6 g |

The resulting polymer was of the general structure:

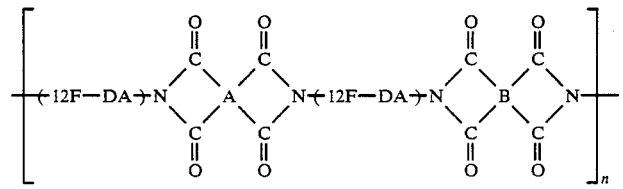

wherein (12F-DA) represents the imide residium of 12F-Diamine, A represents the nucleus of PMDA, B represents the nucleus of BPDA and n is as set forth above.

Properties of the polyimide polymers prepared in Examples 1-3 are shown in Table Polymer dispersity (d) is determined by dividing the weight average molecular weight ($M_w$) by the number average molecular weight (Mn).

The molecular weight of the polymers, whether weight average molecular weight ($M_w$) or number average molecular weight ($M_n$) was measured by gel permeation chromatography (GPC) performed on dilute solutions of the polymer in tetrahydrofuran (THF). The actual apparatus employed consisted of Waters (Millipore Corporation) programmable automatic sampler, vacuum pump, chromatography columns with heater, and a differential refractometer connected to a Shimadzu CR 30A data reduction system with accompanying software (version 1 1, Shimadzu part No. T/N 22301309-91). The refractometer used was a Waters model 410 and four chromatography columns, 500 Angstron, 1000 Angstron, 10,000 Angstron, and 100,000 Angstron (available from Waters) were connected in series.

The system was calibrated using multiple available polystyrene standards ranging in molecular weight as follows:

| GPC CALIBRATION | |
|---|---|
| Calibration Standard (Polystyrene) | Mol. Wt. |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the relative weight average molecular weight $M_w$, the number average molecular weight $M_n$, and polydispersity (d), $M_w/M_n$ were obtained for polymers produced in accordance with the Examples given hereinabove.

Glass transition temperatures (Tg) were determined by differential scanning calorimetry using a Perkin Elmer DSC-4 calorimeter operating at 20° C./min., nitrogen atmosphere at 60cc/min. Glass transition temperature by this method is generally defined as the point of intersection of tangent lines about the point of first inflection of the heating curve of the polymer. Thermogravimetric analysis (TGA) was performed with a Perkin Elmer 65-w analyzer at 20° C./min. with an air rate of 80cc/min. TGA values given herein are for five percent weight loss; in other words, the temperature at which 5% weight loss is observed is reported.

TABLE 1

| | | | | | GPC | | | | TGA 5% Weight Loss at °C. |
|---|---|---|---|---|---|---|---|---|---|
| Example | 12F-Dimaine Mole % | 1st Dianhydride | 2nd Dianhydride | Polyimide Inh. Viscosity | Mw | Mn | (d) | DSC | |
| 1 | 100% | 6F-DA 100% | — | 0.30 | 21,000 | 14,000 | 1.5 | 245° | 525° |
| 2 | 100% | 12F-DA 100% | — | 0.18 | 15,500 | 10,950 | 1.4 | 240° | 525° |

TABLE 1-continued

| | | GPC | | | | | | | |
|---|---|---|---|---|---|---|---|---|---|
| Example | 12F-Dimaine Mole % | 1st Dianhydride | 2nd Dianhydride | Polyimide Inh. Viscosity | Mw | Mn | (d) | DSC | TGA 5% Weight Loss at °C. |
| 3 | 100% | PMDA 50% | BPDA 50% | 0.25 | 16,000 | 10,700 | 1.5 | 243° | 530° |

The polyimides of the present invention may be used in their preimidized form (polyamic acid) as solutions in organic solvent to produce films, coatings, composites and the like which may be cyclized in-situ to form the polyimide by the application of heat.

The polyimides may be molded using techniques such as compression molding or injection molding to produce melt fabricated articles such as fibers, films, safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded molding compounds for high strength structural components such as jet engine components. The polyimides may also be compounded with friction materials to produce molding compounds for high temperature braking components or with abrasive materials such as diamonds for high speed grinding wheels.

The polyimides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polyimides may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polyimides may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the polyimides and polyamic acid precursors of this invention may be used in all applications as disclosed in copending application Ser. No. 124,704, filed in the U.S. Patent and Trademark Office on Nov. 24, 1987, the disclosure of which application is incorporated herein by reference.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A polyimide polymer or copolymer containing at least one structural unit of the formula:

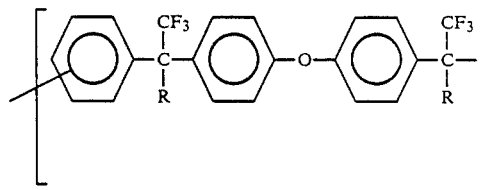

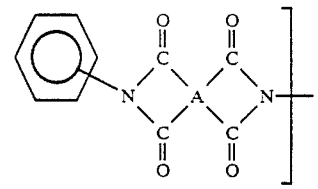

wherein R is selected from the group consisting of $CF_3$ and phenyl and A is a tetravalent aromatic organic radical wherein each pair of carbonyl groups are attached to adjacent carton atoms in the ring of moiety A, said polyimide having a weight average molecular weight of at least about 5,000.

2. The polymer of claim 1 wherein A is selected from the group consisting of phenylene, naphthalene, a bisphenylene compound and mixtures thereof, which may be unsubstituted or ring substituted with a radical selected from the group consisting of halogen, hydroxy, $C_1$ to $C_6$ alkyl and $C_1$ to $C_6$ alkoxy.

3. The polymer of claim 3 prepared by forming the amide-acid condensation product of 4,4-bis[2-(aminophenyl) hexafluorisopropyl] diphenyl ether diphenyl ether with one or more aromatic dianhydrides and imidizing said amide-acid condensation product.

4. The polymer of claim 3 wherein said aromatic dianhydride is selected from the group consisting of bis (3,4-dicarboxyphenyl) ether dianhydride, 3,3'4,4'benzophenone tetracarboxylic dianhydride, 3,3',4,4'-diphenyl tetracarboxylic acid dianhydride, 2,2-bis (3,4 dicarboxy phenyl) hexafluoropropane dianhydride, 1,2,4,5-benzene tetracarboxylic acid dianhydrie, 4,4'-bis diphenyl ether dianhydride, and mixtures thereof.

5. A polyimide polymer containing structural units of the formula:

6. The polymer of claim 1 wherein R is $CF_3$.

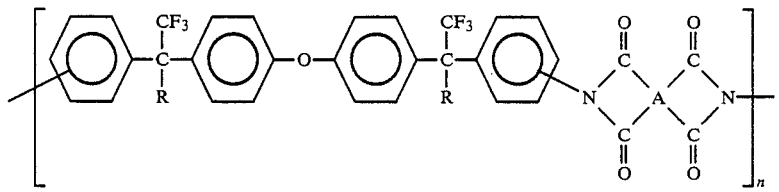

wherein R is selected from the group consisting of CF₃ and phenyl, A is a tetravalent aromatic organic radical wherein each pair of carbonyl groups are attached to adjacent carbon atoms in the ring moiety A, and n is a number sufficient to give rise to a polymer having an inherent viscosity of at least about 0.05 as measured from a solution of the polymer in dimethyl acetamide at 25° C.

7. The polymer of claim 6 wherein said aromatic dianhydride is selected from the group consisting of bis (3,4-dicarboxyphenyl) ether dianhydride, 3,3′4,4′benzophenone tetracarboxylic dianhydride, 8. The polymer of claim 5 wherein A is selected from the group consisting of phenylene, naphthalene, a bisphenylene cc,mpound and mixtures thereof, which may be unsubstituted or ring substituted with a radical selected from the group consisting of halogen, hydroxy, C₁ to C₆ alkyl and C₁ to C₆ alkoxy. 3,3′,4,4′-diphenyl tetracarboxylic acid dianhydride, 2,2-bis (3,4 dicarboxy phenyl) hexafluoropropane dianhydride, 1,2,4,5-benzene tetracarboxylic acid dianhydride, 4,4′-bis[2-(3,4-dicarboxyphenyl) hexafluoroisopropyl] diphenyl ether dianhydride, and mixtures thereof.

9. The polymers of claim 3 or 5 wherein said diamine is 4,4′-bis diphenylether.

10. A copolyimide of claim 4 comprising a mixture of aromatic dianhydrides.

11. A film comprising the polymer of claim 1 or claim 5.

12. The polymer of claim 5 prepared by forming the amide-acid condensation product of a 4,4′-bis diphenyl ether with one or more aromatic dianhydrides and imidizing said amide-acid condensation product.

13. The polymer of claim 5 wherein R is CF₃.

* * * * *